S. Nickelson,
Sawing Stone.

N° 14,823.    Patented May 6, 1856.

UNITED STATES PATENT OFFICE.

SAMUEL NICKELSON, OF PULASKI, TENNESSEE.

MACHINE FOR SAWING MARBLE IN KERFS OF VARYING ANGLES.

Specification of Letters Patent No. 14,823, dated May 6, 1856.

*To all whom it may concern:*

Be it known that I, SAMUEL NICKELSON, of Pulaski, in the county of Giles and State of Tennessee, have invented a new and Improved Machine for Sawing Stone; and I do hereby declare that the following is a full, clear, and exact description of the same, reference being had to the annexed drawings, making a part of this specification, in which—

Figure 1:
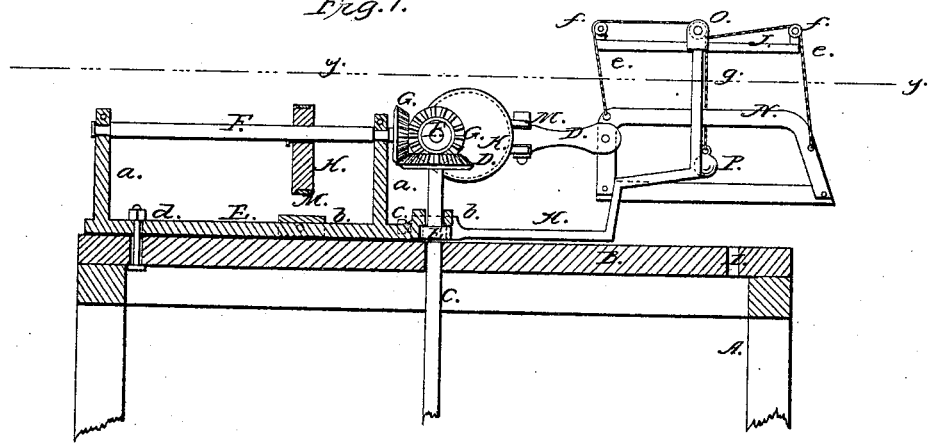
Figure 2:
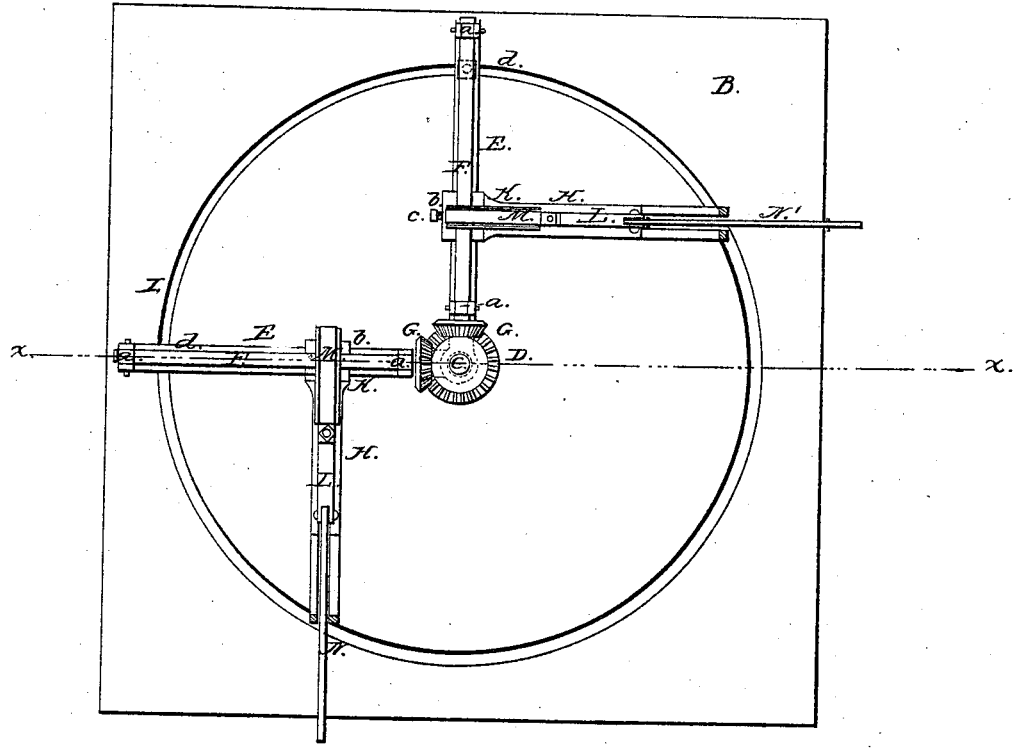

Figure 1 is a vertical section of my improvement, $(x)$, $(x)$, Fig. 2 showing the plane of section. Fig. 2, is a horizontal section of ditto $(y)$ $(y)$, Fig. 1 showing the plane of section.

Similar letters of reference indicate corresponding parts in the two figures.

To enable those skilled in the art to make and use my invention, I will proceed to describe its construction and operation.

A, represents a rectangular frame on the upper part of which a platform B, is placed.

C, represents a vertical shaft, the lower end of which is stepped in the lower part of the frame A. The upper part of said shaft passes through the center of the platform B, and has a bevel wheel D, upon it.

E E are two bars the inner ends of which are fitted on the shaft C, and are allowed to turn freely upon it. These bars rest on the platform B. To each bar E, there are attached two uprights $(a)$, $(a)$, one near each end, and a shaft F, is fitted in the upper parts of the uprights of each bar, the shafts being allowed to turn freely in the uprights $(a)$, $(a)$. To the inner ends of the shafts F there are attached bevel wheels G, one to each shaft. These bevel wheels gear into the bevel wheel D, on the shaft C. On each bar E there is fitted a sliding bar H. These bars H, have sockets $(b)$, at their inner ends through which the bars E, pass the sockets being allowed to slide on the bars E. The bars H are secured at any desired points on the bars E, by set screws $(c)$, which pass through the back ends of the sockets $(b)$. The bars E, near their outer ends have screw bolts $(d)$ passing vertically through them, said bolts passing through an annular slot I, made through the platform B. The outer ends of the bar H, are curved or bent upward and are slotted, and also have each a horizontal bar J, attached at their upper ends, the bars J being parallel with the bars H. On each shaft F there is placed an eccentric K, to which pitmen L, are attached by straps M, which are fitted around the eccentrics. The outer ends of the pitmen L, are pivoted to saw frames N, which are fitted and work in the slotted upright portions of the bars H, saws N' being fitted in the frames N. To the upper part of each bar H there is attached a roller O. Around these rollers cords or chains $(e)$, pass said cords or chains also passing over pulleys $(f)$, at each end of the bars J, the lower ends of the cords or chains being attached to the front and back ends of the saw frames as shown clearly in Fig. 1. To each roller O, there is attached a cord or chain $(g)$, having a counterpoise P, secured to its lower end.

The operation is as follows. The saw frames N, by loosening the bolts $(d)$, may be turned around, so as to be more or less angular or oblique with each other the position of the saw frames corresponding with the taper intended to be given the stone or marble block. The marble or stone blocks are placed upon the platform B underneath the saws N', and the shaft C, being rotated in any proper manner the two saw frames will have a reciprocating motion communicated to them by the eccentrics K, K, and pitmen L, L, the saws feeding themselves to their work by their own gravity, the weight of the saws and frames being rather greater than that of the weights or counterpoises P. The bars H, may be adjusted on the bars E according to the width the block is to be sawed.

Having thus described my invention, what I claim as new and desire to secure by Letters Patent is.

The adjustable or sliding bars H, attached to the bars E, as shown when said bars are curved or bent so as to form saw frame guides in combination with the pivoted pitmen L, L, and eccentrics K, K, on the shafts F, F, whereby the saw frames, and the devices for driving them, are all attached to and move with the bars H, thereby allowing the saws to be adjusted more or less angularly with each and at required distances apart with the greatest facility.

SAMUEL NICKELSON.

Witnesses:
B. M. CARTER,
THOS. S. REDDLE.